United States Patent
Kim

(10) Patent No.: US 9,676,381 B2
(45) Date of Patent: Jun. 13, 2017

(54) CONTROL METHOD OF POWER GENERATION FOR VEHICLE ACCORDING TO DRIVING STATE THEREOF

(71) Applicant: Hyundai Motor Company, Seoul (KR)

(72) Inventor: Hyun Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 35 days.

(21) Appl. No.: 14/789,304

(22) Filed: Jul. 1, 2015

(65) Prior Publication Data

US 2016/0167636 A1 Jun. 16, 2016

(30) Foreign Application Priority Data

Dec. 11, 2014 (KR) ........................ 10-2014-0178169

(51) Int. Cl.
| | |
|---|---|
| *B60W 10/30* | (2006.01) |
| *B60W 40/107* | (2012.01) |
| *B60W 10/26* | (2006.01) |
| *B60W 10/06* | (2006.01) |
| *B60W 10/08* | (2006.01) |
| *B60W 30/18* | (2012.01) |
| *B60W 20/13* | (2016.01) |

(52) U.S. Cl.
CPC ............ *B60W 10/30* (2013.01); *B60W 10/06* (2013.01); *B60W 10/08* (2013.01); *B60W 10/26* (2013.01); *B60W 20/13* (2016.01); *B60W 30/18009* (2013.01); *B60W 40/107* (2013.01); *B60W 2510/244* (2013.01); *B60W 2510/30* (2013.01); *B60W 2710/244* (2013.01); *B60W 2720/106* (2013.01); *Y02T 10/163* (2013.01)

(58) Field of Classification Search
CPC .... B60W 10/30; B60W 10/26; B60W 40/107; B60W 2720/106; B60W 2510/30; B60W 2510/244
See application file for complete search history.

(56) References Cited

U.S. PATENT DOCUMENTS

| | | | | |
|---|---|---|---|---|
| 5,881,559 | A * | 3/1999 | Kawamura | ............ B60K 6/24 123/192.2 |
| 6,554,088 | B2 * | 4/2003 | Severinsky | ............ B60H 1/004 180/65.23 |

(Continued)

FOREIGN PATENT DOCUMENTS

| | | |
|---|---|---|
| JP | 2007-262970 A | 10/2007 |
| JP | 2007-327401 A | 12/2007 |

(Continued)

*Primary Examiner* — Jerrah Edwards
*Assistant Examiner* — Majdi Alsomiri
(74) *Attorney, Agent, or Firm* — Morgan Lewis & Bockius LLP

(57) ABSTRACT

A generation control method for a vehicle may include a deceleration driving determination step of determining whether a driving state of the vehicle is a deceleration driving state, an acceleration driving determination step of determining whether the driving state of the vehicle is an acceleration driving state when the driving state of the vehicle is not the deceleration driving state, and a constant speed driving generation step of performing constant speed driving generation when the driving state of the vehicle is not the deceleration driving state or the acceleration driving state.

10 Claims, 8 Drawing Sheets

(56) References Cited

U.S. PATENT DOCUMENTS

| | | | |
|---|---|---|---|
| 8,111,036 B2* | 2/2012 | Rosenstock | H02J 7/1415 307/10.1 |
| 2002/0109407 A1* | 8/2002 | Morimoto | B60K 6/28 307/10.1 |
| 2009/0115378 A1* | 5/2009 | Ko | H02J 7/1446 322/25 |
| 2010/0286857 A1* | 11/2010 | Otake | B60L 7/10 701/22 |
| 2012/0029749 A1* | 2/2012 | Ulrey | B60W 10/06 701/22 |
| 2013/0116914 A1* | 5/2013 | Morimura | B60L 11/14 701/112 |

FOREIGN PATENT DOCUMENTS

| | | |
|---|---|---|
| JP | 2008-274797 A | 11/2008 |
| JP | 2009-126303 A | 6/2009 |
| JP | 2010-255603 A | 11/2010 |
| KR | 10-2005-0018331 A | 2/2005 |
| KR | 10-2006-0033510 A | 4/2006 |
| KR | 10-2010-0041131 A | 4/2010 |
| KR | 10-1454444 B1 | 10/2014 |

* cited by examiner

<DECELERATION DRIVING (REGENERATIVE BRAKING)>

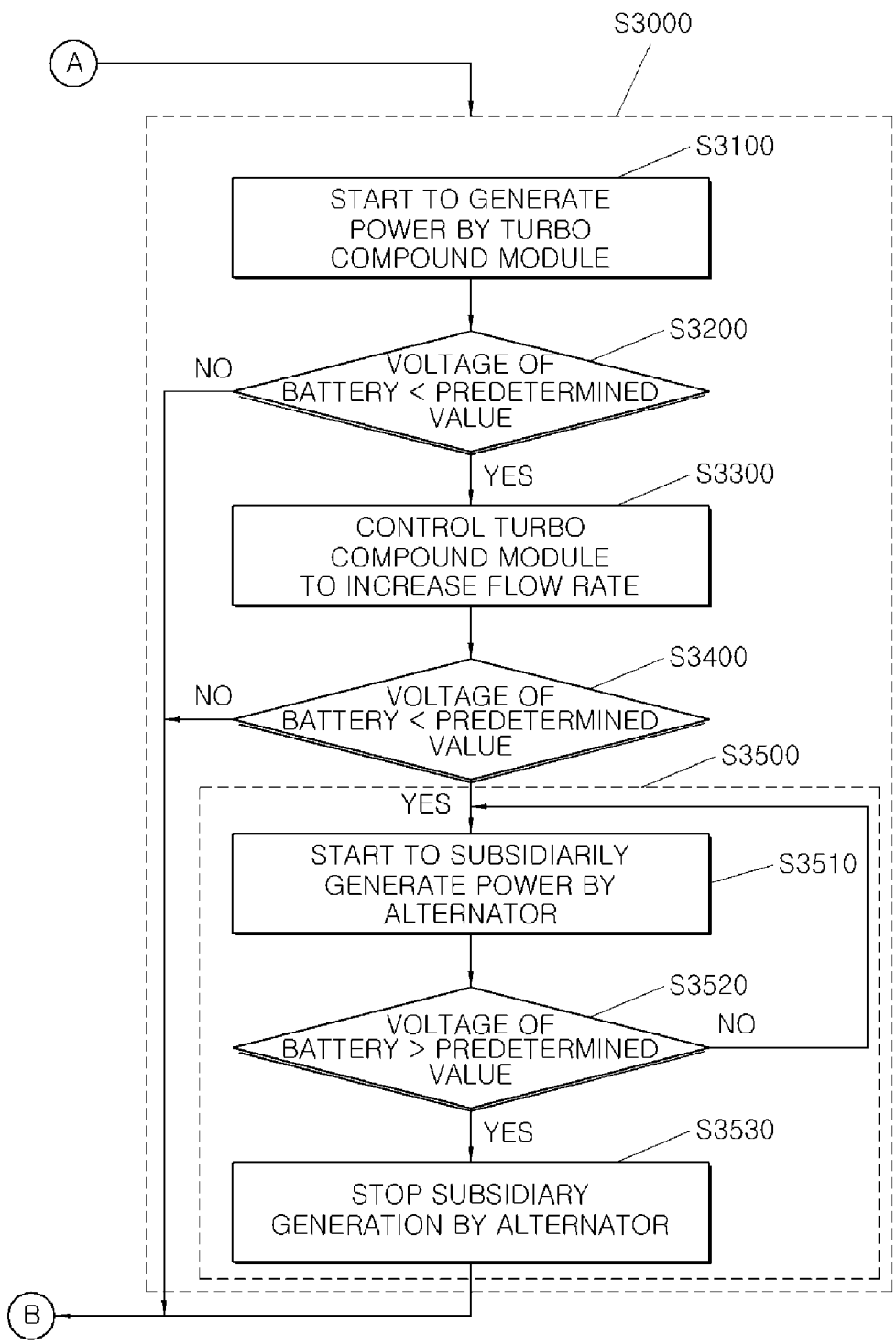

CONTROL METHOD OF POWER GENERATION FOR VEHICLE ACCORDING TO DRIVING STATE THEREOF

CROSS-REFERENCE TO RELATED APPLICATIONS

The present application claims priority of Korean Patent Application Number 10-2014-0178169 filed on Dec. 11, 2014, the entire contents of which application are incorporated herein for all purposes by this reference.

BACKGROUND OF INVENTION

Field of Invention

The present invention relates to a generation control method for a vehicle, and more particularly, to a generation control method for a vehicle which determines whether a driving state of a vehicle is a deceleration driving state, an acceleration driving state, or a constant speed driving state and controls an alternator to start generating power to charge a battery if it is determined that the vehicle is in the deceleration driving state, controls a turbo compound module to start generating power to charge the battery if it is determined that the vehicle is in the acceleration driving state, and controls the turbo compound module to start generating power to charge the battery if it is determined that the vehicle is in the constant speed driving state, and controls the alternator to start generating power to subsidiarily charge the battery when the generation of the turbo compound module does not charge the battery to exceed a predetermined voltage.

Description of Related Art

FIG. 1 is a diagram illustrating a generation control using the existing first generation alternator and second generation alternator, FIG. 2 is a block diagram illustrating a flow of energy when a vehicle is in an acceleration driving state and a constant speed driving state in the generation control using the existing second generation alternator, and FIG. 3 is a block diagram illustrating the flow of energy when the vehicle is in a deceleration driving state in the generation control using the existing second generation alternator.

In the generation control technologies according to the related art, there is a generation control technology using an alternator (or generator) 10 controlling generation timing of the alternator. Here, the generation control technology may mean a technology of producing electric energy using a driving state of a vehicle.

Referring to FIGS. 1 to 3, as the generation control technology using the alternator for controlling the generation timing of the alternator depending on a state of an engine and a vehicle to improve fuel economy, there are the generation control technology 5 using the first generation alternator and the generation control technology 6 using the second generation alternator.

In more detail, the generation control technology using the first generation alternator reduces an engine load by minimizing the generation using the alternator when the vehicle is in an acceleration driving state or a constant speed driving state 4 and maximizes the generation using the alternator when the vehicle is in the deceleration driving state.

Further, the generation control technology using the second generation alternator stops the generation using the alternator when the vehicle is in an acceleration driving state or a constant speed driving state and maximizes the generation using the alternator when the vehicle is in the deceleration driving state.

Therefore, the electric energy generated by the alternator 10 is stored in an energy storage device 30 and the stored energy is output to an electric field load 40.

Meanwhile, a turbo compound module may be configured by combining a generator 10 with a turbo charger module. Further, the turbo compound module may produce electric energy.

FIG. 4 is a diagram illustrating a generation control using the turbo compound module. Referring to FIG. 4, the generation control using the turbo compound module is a generation control using rotational energy of the turbo charger module by exhaust gas of a turbo engine and has a generation quantity varying depending on a flow rate of the exhaust gas. In more detail, the generation control 7 using the turbo compound module maximizes the power generation using the turbo compound module when the vehicle is in the acceleration driving state or the constant speed driving state and stops the power generation using the turbo compound module when the vehicle is in the deceleration driving state.

As described above, the existing generation control technology using the alternator generates power only when the vehicle is in the deceleration driving and stops the generation when the vehicle is in the acceleration driving state or the constant speed state. As a result, the existing generation control technology has a problem in that the generation efficiency may not be optimized. Therefore, a generation control method for a vehicle capable of producing electric energy using a driving state of a vehicle even when the vehicle is in the deceleration driving state or the vehicle is in the acceleration driving state or the constant speed driving state is required.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention is directed to a generation control method for a vehicle which determines whether a driving state of a vehicle is a deceleration driving state, an acceleration driving state, or a constant speed driving state and controls an alternator to start generating power to charge a battery if it is determined that the vehicle is in the deceleration driving state, controls a turbo compound module to start generating power to charge the battery if it is determined that the vehicle is in the acceleration driving state, and controls the turbo compound module to start generating power to charge the battery if it is determined that the vehicle is in the constant speed driving state, and controls the alternator to start generating power to subsidiarily charge the battery when the generation of the turbo compound module does not charge the battery to exceed a predetermined voltage.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, a generation control method for a vehicle includes: a deceleration driving determination step of determining whether a driving state of the vehicle is a deceleration driving state; an acceleration driving determination step of determining whether the driving state of the vehicle is an acceleration driving state when the driving state of the vehicle is not the deceleration driving state; and a constant speed driving generation step of performing constant speed driving generation when the driving state of the vehicle is not the deceleration driving state or the acceleration driving state.

The deceleration driving determination step may include: an alternator generation step of allowing an alternator to start generating power to charge a battery when the driving state of the vehicle is the deceleration driving state; and a maximum generation control step of maximally increasing a generation quantity of the alternator.

The acceleration driving determination step may include: a turbo compound generation step of allowing a turbo compound module to start generating power to charge a battery when the driving state of the vehicle is the acceleration driving state; and a maximum flow rate control step of maximally increasing a flow rate of exhaust gas introduced into the turbo compound module.

The constant speed driving generation step may include: a turbo generation starting step of allowing a turbo compound module to start generating power to charge a battery; a battery voltage determination step of determining whether a voltage of the battery charged by the turbo compound module is less than a predetermined value; a flow rate increasing control step of increasing a flow rate of exhaust gas introduced into the turbo compound module when the voltage of the battery is less than the predetermined value; a battery voltage re-determination step of determining whether the voltage of the battery is less than the predetermined value; and an alternator generation step of allowing an alternator to start generating power until the voltage of the battery exceeds the predetermined value if it is determined in the battery voltage re-determination step that the voltage of the battery is less than the predetermined value so as to charge the battery.

In this case, the constant speed driving generation step may be performed when the driving state of the vehicle is a constant driving state or an idle driving state.

The constant speed driving generation step may end, if it is determined in the battery voltage determination step that the voltage of the battery charged by the turbo compound module is equal to or more than the predetermined value.

In the flow rate increasing control step, a valve open value of the turbo compound module may be controlled to increase the flow rate of exhaust gas introduced into the turbo compound module.

The constant speed driving generation step may end, if it is determined in the battery voltage re-determination step that the voltage of the battery is equal to or more than the predetermined value.

The alternator generation step may include: an alternator generation starting step of allowing the alternator to start generating power when the voltage of the battery is less than the predetermined value to charge the battery; an alternator charging voltage determination step of determining whether the voltage of the battery charged by the alternator exceeds the predetermined value; and an alternator generation stopping step of stopping the generation of the alternator when the voltage of the battery exceeds the predetermined value.

The alternator generation starting step may be performed again, if it is determined in the alternator charging voltage determination step that the voltage of the battery charged by the alternator is equal to or less than the predetermined value.

In accordance with another aspect of the present invention, a generation control method for a vehicle includes: an acceleration driving determination step of determining whether a driving state of the vehicle is an acceleration driving state; a deceleration driving determination step of determining whether the driving state of the vehicle is a deceleration driving state when the driving state of the vehicle is not the acceleration driving state; and an acceleration driving generation step of performing constant speed driving generation when the driving state of the vehicle is not the deceleration driving state or the acceleration driving state.

The acceleration driving determination step may include: a turbo compound generation step of allowing a turbo compound module to start generating power to charge a battery when the driving state of the vehicle is the acceleration driving state; and a maximum flow rate control step of maximally increasing a flow rate of exhaust gas introduced into the turbo compound module.

The deceleration driving determination step may include: an alternator generation step of allowing an alternator to start generating power to charge a battery when the driving state of the vehicle is the deceleration driving state; and a maximum generation control step of maximally increasing a generation quantity of the alternator.

The constant speed driving generation step may include: a turbo generation starting step of allowing a turbo compound module to start generating power to charge a battery; a battery voltage determination step of determining whether a voltage of the battery charged by the turbo compound module is less than a predetermined value; a flow rate increasing control step of increasing a flow rate of exhaust gas introduced into the turbo compound module when the voltage of the battery is less than the predetermined value; a battery voltage re-determination step of determining whether the voltage of the battery is less than the predetermined value; and an alternator generation step of allowing an alternator to start generating power until the voltage of the battery exceeds the predetermined value if it is determined in the battery voltage re-determination step that the voltage of the battery is less than the predetermined value so as to charge the battery.

In this case, the constant speed driving generation step may be performed when the driving state of the vehicle is a constant driving state or an idle driving state.

The constant speed driving generation step may end, if it is determined in the battery voltage determination step that the voltage of the battery charged by the turbo compound module is equal to or more than the predetermined value.

In the flow rate increasing control step, a valve open value of the turbo compound module may be controlled to increase the flow rate of exhaust gas introduced into the turbo compound module.

The constant speed driving generation step may end, if it is determined in the battery voltage re-determination step that the voltage of the battery is equal to or more than the predetermined value.

The alternator generation step may include: an alternator generation starting step of allowing the alternator to start generating power when the voltage of the battery is less than the predetermined value to charge the battery; an alternator charging voltage determination step of determining whether the voltage of the battery charged by the alternator exceeds the predetermined value; and an alternator generation stopping step of stopping the generation of the alternator when the voltage of the battery exceeds the predetermined value.

The alternator generation starting step may be performed again, if it is determined in the alternator charging voltage determination step that the voltage of the battery charged by the alternator is equal to or less than the predetermined value.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 5A and 5B are flow charts illustrating a generation control method for a vehicle according to a first exemplary embodiment of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is to be noted that technical terms used in the specification are used for describing specific embodiments and do not limit the present invention. In addition, unless indicated otherwise in the specification, it is to be understood that all the technical terms used in the specification are construed as meaning as those that are generally understood by those who skilled in the art and as excessively comprehensive meanings and excessively reduced meanings. Further, the accompanying drawings are provided to easily understand the technical spirit of the present invention disclosed in the present specification, and therefore the technical spirit is not limited to the accompany drawings. Therefore, it is to be construed that the accompanying drawings include all modifications and replacements included in the technical spirit and the technical scope disclosed n the present specification.

Hereinafter, a generation control method according to a first exemplary embodiment of the present invention will be described with reference to the accompanying drawings.

Figure 1:
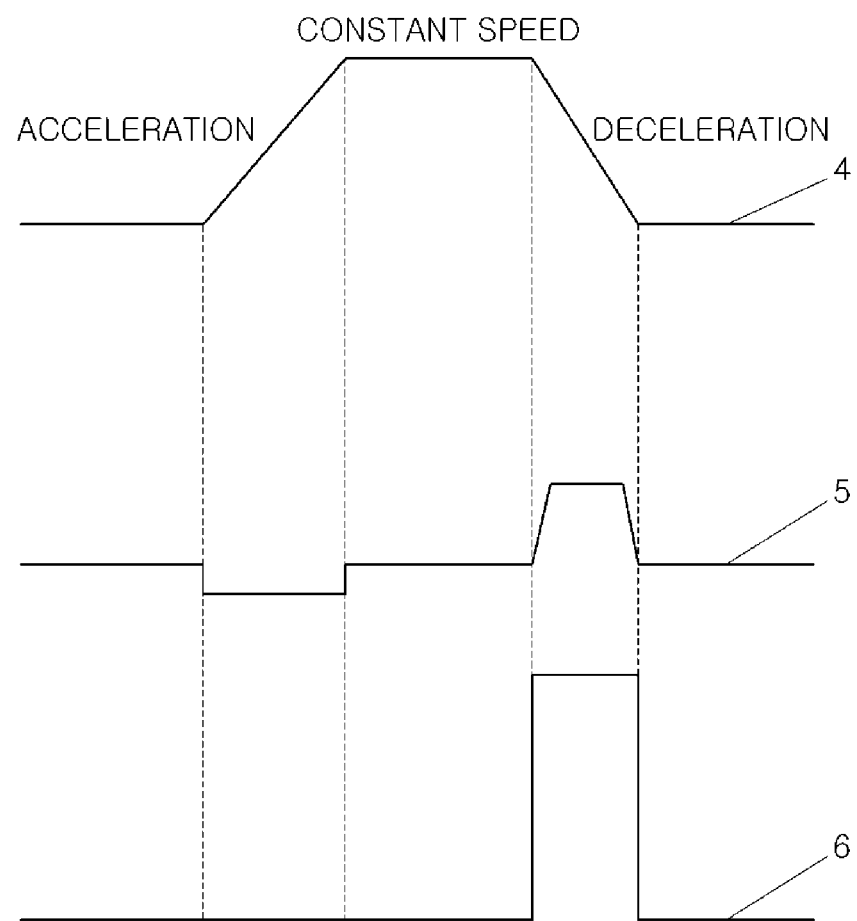
FIG. 1 is a diagram illustrating a generation control using the existing first generation alternator and second generation alternator according to related art.
Figure 2:
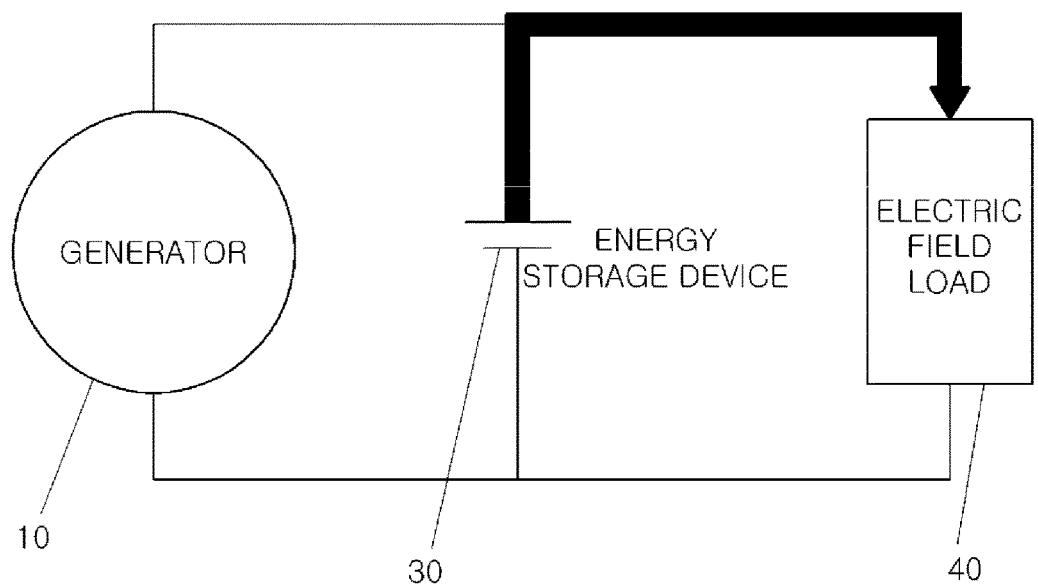
FIG. 2 is a block diagram illustrating a flow of energy when a vehicle is in an acceleration driving state and a constant speed driving state in the generation control using the existing second generation alternator according to related art.
Figure 3:
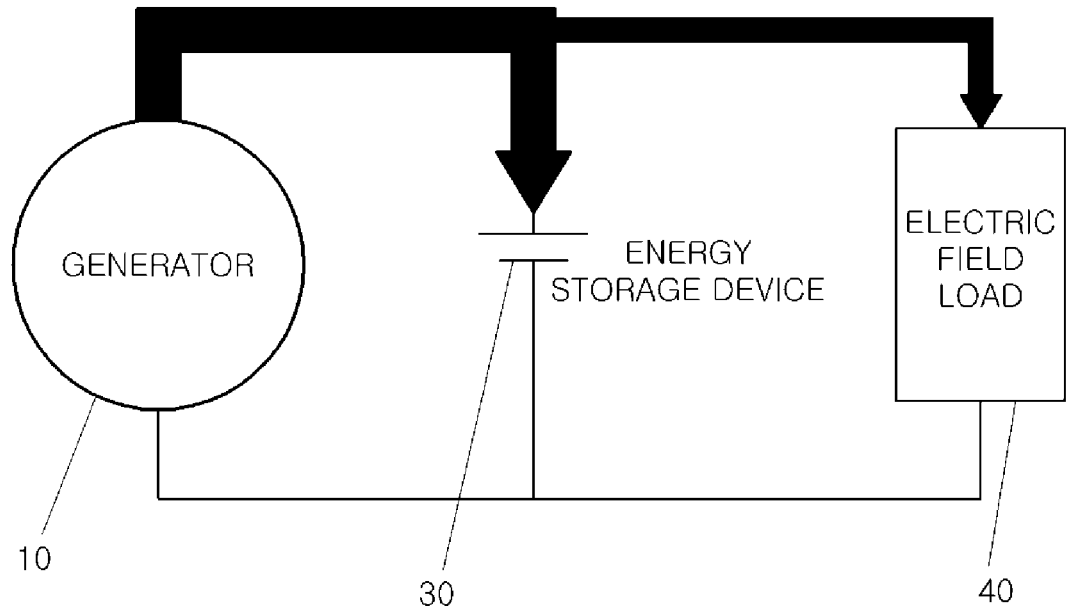
FIG. 3 is a block diagram illustrating a flow of energy when the vehicle is in a deceleration speed driving state in the generation control using the existing second generation alternator according to related art.
Figure 4:
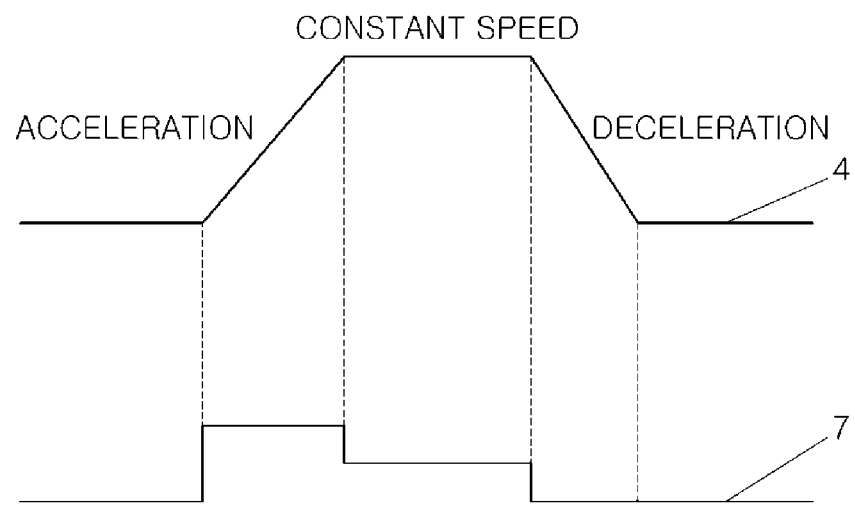
FIG. 4 is a diagram illustrating a generation control using a turbo compound module according to related art.
Figure 5A:
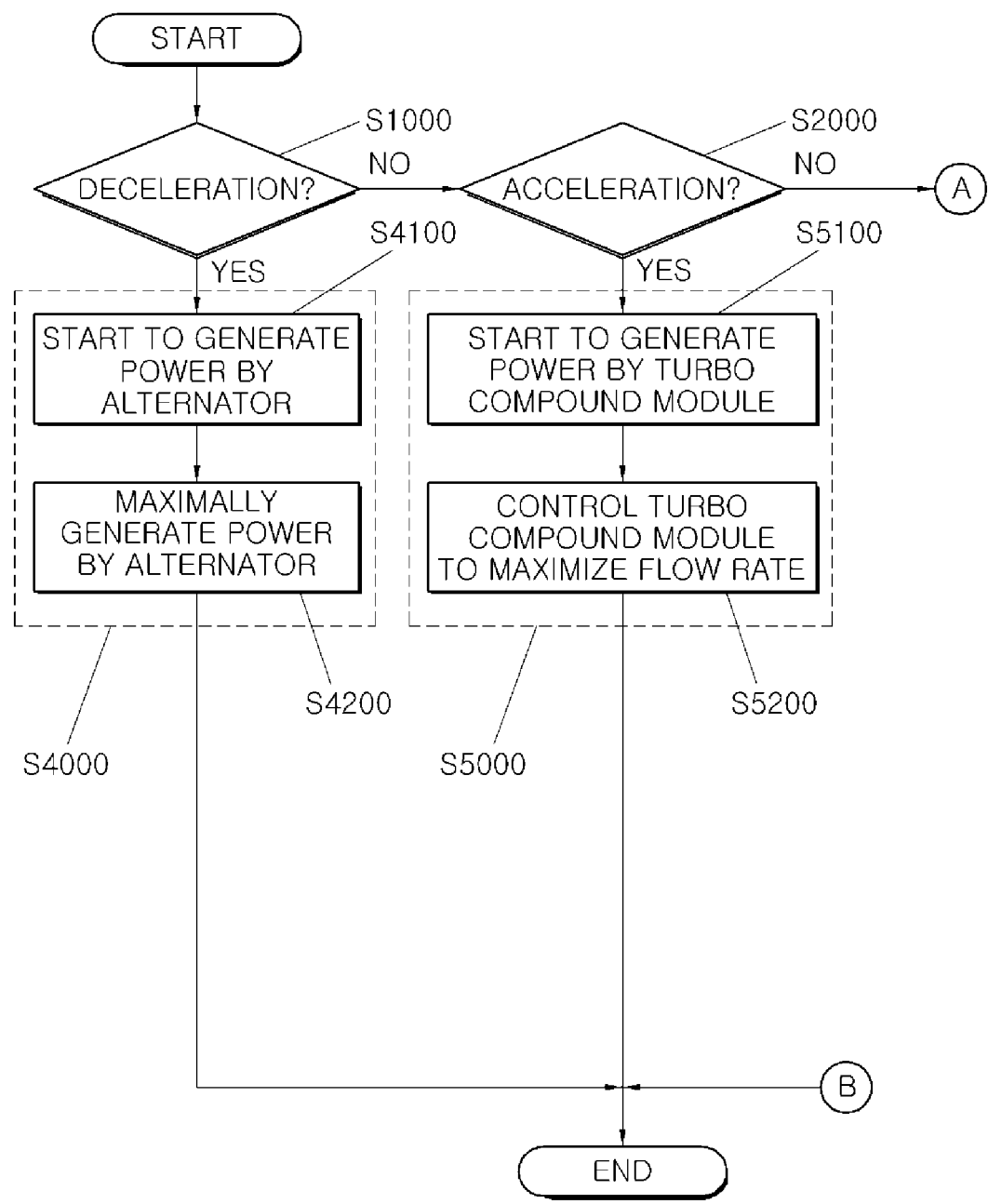
Figure 7:
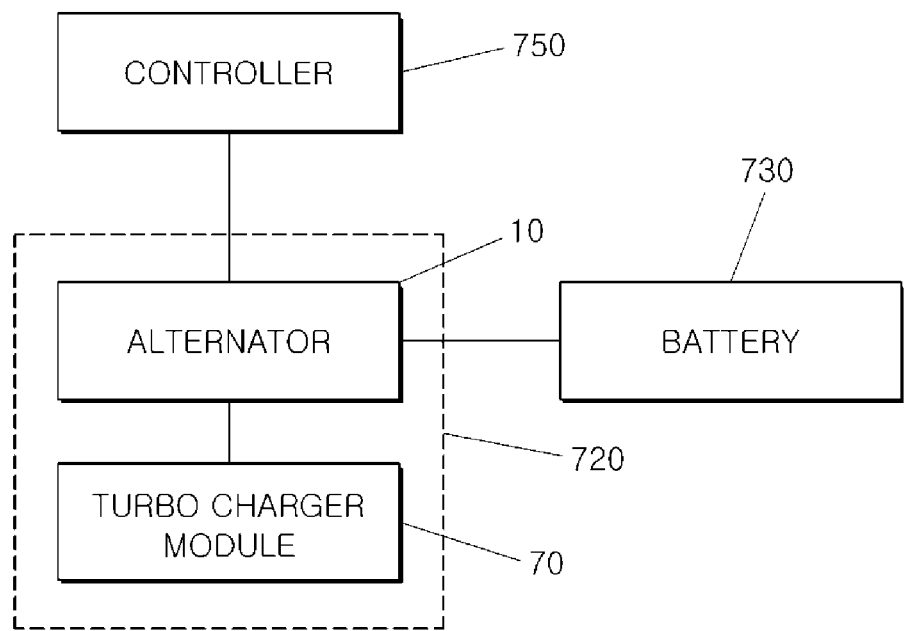
FIG. 7 is a configuration block diagram for implementing a generation control for a vehicle according to an exemplary embodiment of the present invention.

FIGS. 5A and 5B are flow charts illustrating a generation control method for a vehicle according to a first exemplary embodiment of the present invention. FIG. 7 is a configuration block diagram for implementing a generation control for a vehicle according to an exemplary embodiment of the present invention.

Referring to FIGS. 5A and 7, the generation control method for a vehicle according to the first exemplary embodiment of the present invention may include a deceleration driving determination step (S1000), an acceleration driving generation step (S2000), and a constant speed driving generation step (S3000).

In the deceleration driving determination step (S1000), it is determined whether a driving state of a vehicle is a deceleration driving state. In more detail, in the deceleration driving determination step (S1000), a controller 750 may determine whether the vehicle is driven while a speed of a vehicle is decelerated. Here, the controller 750 is a device for performing the generation control method according to the exemplary embodiment of the present invention and may be an engine control unit (ECU). In this case, the determination on the vehicle is driven while the speed of the vehicle is decelerated may be made by identifying whether an acceleration of the vehicle is a negative number.

If it is determined in the deceleration driving determination step (S1000) that the driving state of the vehicle is a deceleration driving state, a deceleration driving generation step (S4000) may be performed. That is, if it is determined in the deceleration driving determination step (S1000) that the driving state of the vehicle is the deceleration driving state, the controller 750 may perform the deceleration driving generation step (S4000). In more detail, the deceleration driving generation step (S4000) may include an alternator generation step 4100 and a maximum generation control step (S4200).

In the alternator generation step (S4100), when the driving state of the vehicle is the deceleration driving state, an alternator 10 starts to generate power to charge a battery 730. In more detail, in the alternator generation step (S4100), when the driving state of the vehicle is the deceleration driving state, the controller 750 may control the alternator 10 to generate power, thereby charging the battery 730.

In the maximum generation control step (S4200), a generation quantity of the alternator 10 is increased maximally. In more detail, in the maximum generation control step (S4200), the controller 750 may control the alternator 10 to maximally increase the generation quantity of the alternator 10 to charge the battery 730. Meanwhile, after the maximum generation control step (S4200), the deceleration driving generation step (S4000) may end.

In the acceleration driving determination step (S2000), when the driving state of the vehicle is not the deceleration driving state, it is determined whether the driving state of the vehicle is the acceleration driving state. In more detail, in the acceleration driving determination step (S2000), when the driving state of the vehicle is not the deceleration driving state, the controller 750 may determine whether the vehicle is driven while the speed 4 of the vehicle is accelerated. Here, the controller 750 is a device for performing the generation control method according to the exemplary embodiment of the present invention and may be an engine control unit (ECU). In this case, the determination on the vehicle is driven while the speed 4 of the vehicle is accelerated may be made by identifying whether the acceleration of the vehicle is a positive number.

If it is determined in the acceleration driving determination step (S2000) that the driving state of the vehicle is the acceleration driving state, the controller 750 may perform an acceleration driving generation step (S5000) which performs acceleration driving generation. In more detail, the acceleration driving generation step (S5000) may include a turbo compound generation step S100 and a maximum flow rate control step (S5200).

In the turbo compound generation step (S5100), when the driving state of the vehicle is the acceleration driving state, a turbo compound module 720 starts to generate power to charge the battery 730. In more detail, in the alternator generation step (S4100), when the driving state of the vehicle is the deceleration driving state, the controller 750 may control the alternator 10 to generate power, thereby charging the battery 730.

In the maximum flow rate control step (S5200), a flow rate of exhaust gas introduced into the turbo compound module 720 is maximally increased. In more detail, in the maximum flow rate control step (S5200), the controller 750 controls the turbo compound module 720 to maximally increase the flow rate of exhaust gas introduced into the turbo compound module 720 and thus may control the turbo compound module 720 to charge the battery 730. Here, as the flow rate of exhaust gas introduced into the turbo compound module 720 is increased, the turbo compound module 720 may generate a larger amount of power to charge the battery 730. The turbo compound module 720 may be configured by combining the alternator or generator 10 with a turbo charger module 70. Meanwhile, after the maximum flow rate control step (S5200), the acceleration driving generation step (S5000) may end.

Referring to FIGS. 5B and 7, when the driving state of the vehicle is not the acceleration driving state or the deceleration driving state, the constant speed driving generation is performed in the constant speed driving generation step (S3000). That is, in the constant speed driving generation step (S3000), when the driving state of the vehicle is not the acceleration driving state or the deceleration driving state, the controller 750 may perform the constant speed driving generation. In this case, the constant speed driving generation step (S3000) may be performed when the driving state of the vehicle is the constant driving state or an idle driving state.

Here, the controller 750 is a device for performing the generation control method according to the exemplary embodiment of the present invention and may be an engine control unit (ECU). In more detail, the constant speed driving generation step (S3000) may include a turbo generation starting step (S3100), a battery voltage determination step (S3200), a flow rate increasing control step (S3300), a battery voltage re-determination step (S3400), and an alternator generation step (S3500).

In the turbo generation starting step (S3100), the turbo compound module 720 starts to generate power, thereby charging the battery 730. In more detail, in the turbo generation starting step (S3100), when the driving state of the vehicle is not the acceleration driving state or the deceleration driving state, the controller 750 may control the turbo compound module 720 to generate power, thereby charging the battery 730.

In the battery voltage determination step (S3200), it is determined whether the voltage of the battery 730 charged by the turbo compound module 720 is less than a predetermined value. In more detail, in the battery voltage determination step (S3200), the controller 750 compares the voltage of the battery 730 charged by the turbo compound module 720 with a predetermined value to determine whether the voltage of the battery 730 charged by the turbo compound module 720 is less than the predetermined value. Here, the predetermined value may be a minimum charging voltage of the battery, for example, about 12.5 V.

Meanwhile, if it is determined in the battery voltage determination step (S3200) that the voltage of the battery 730 charged by the turbo compound module 720 is equal to or more than the predetermined value, the constant speed generation step (S3000) may end.

In the flow rate increasing control step (S3300), when the voltage of the battery 730 is less than the predetermined value, the flow rate of exhaust gas introduced into the turbo compound module 720 is increased. In more detail, in the maximum flow rate control step (S3300), when the voltage of the battery 730 is less than the predetermined value, the controller 750 controls the turbo compound module 720 to increase the flow rate of exhaust gas introduced into the turbo compound module 720 and thus may control the turbo compound module 720 to charge the battery 730.

In this case, the controller 750 may control the turbo compound module 720 until the flow rate of exhaust gas introduced into the turbo compound module 720 is maximally increased. In particular, in the flow rate increasing control step (S3300), the controller 750 may control a valve open value of the turbo compound module 720 to increase the flow rate of exhaust gas introduced into the turbo compound module 20. Here, as the flow rate of exhaust gas introduced into the turbo compound module 720 is increased, the turbo compound module 720 may generate a larger amount of power to charge the battery 730.

In the battery voltage re-determination step (S3400), it is determined whether the voltage of the battery 730 is less than the predetermined value. In more detail, in the battery voltage re-determination step (S3400), the controller 750 compares the voltage of the battery 730 charged by the turbo compound module 720 increasing the flow rate with a predetermined value to determine whether the voltage of the battery 730 charged by the turbo compound module 720 is less than the predetermined value. Here, the predetermined value may be the minimum charging voltage of the battery 730, for example, 12.5 V.

Meanwhile, if it is determined in the battery voltage re-determination step (S3400) that the voltage of the battery 730 is equal to or more than the predetermined value, the constant speed driving generation step (S3000) may end.

In the alternator generation step (S3500), when the voltage of the battery 730 is less than the predetermined value, the alternator 10 starts to generate power until the battery voltage 30 exceeds the predetermined value, thereby charging the battery 730. That is, in the alternator generation step (S3500), when the turbo compound module 720 does not charge the battery 730 at a minimum charging voltage or more, the controller 750 may control the alternator 10 to charge the battery 730 at the minimum charging voltage or more. In this case, the turbo compound module 720 and the alternator 10 may simultaneously charge the battery 730. In more detail, the alternator generation step (S3500) may include an alternator generation starting step (S3510), an alternator charging voltage determination step (S3520), and an alternator generation stopping step (S3530).

In the alternator generation starting step (S3510), when the voltage of the battery 730 is less than the predetermined value, the alternator 10 starts to generate power, thereby charging the battery 730. In more detail, in the alternator generation starting step (S3510), when the voltage of the battery 730 is less than the predetermined value, the controller 750 may control the alternator 10 to start generating power, thereby charging the battery 730. In this case, the controller 750 also controls the turbo compound module 720 to increase the flow rate of exhaust gas introduced into the turbo compound module 20, thereby charging the battery 730.

In the alternator charging voltage determination step (S3520), it is determined whether the voltage of the battery 730 charged by the alternator 10 exceeds the predetermined value. In more detail, in the alternator charging voltage determination step (S3520), the controller 750 may compare the voltage of the battery 730 charged by the alternator 10 and the turbo compound module with the predetermined value to determine whether the voltage of the battery 730 exceeds the predetermined value. Here, the predetermined value may be the minimum charging voltage of the battery 730, in particular, 12.5 V.

Meanwhile, if it is determined in the alternator charging voltage determination step (S3520) that the voltage of the battery 730 charged by the alternator is equal to or less than the predetermined value, the alternator generation starting step (S3510) may be performed again.

In the alternator generation stopping step (S3530), when the voltage of the battery 730 exceeds the predetermined value, the generation of the alternator 10 stops. In more detail, in the alternator generation stopping step (S3530), when the voltage of the battery 730 charged by the alternator 10 and the turbo compound module exceeds the predetermined value, the controller 40 may control the alternator 10 to generate power, thereby stopping charging the battery 730. Meanwhile, after the alternator generation stopping step (S3530), the constant speed generation step (S5000) may end.

Hereinafter, a generation control method according to a second exemplary embodiment of the present invention will be described with reference to the accompanying drawings.

Figure 6A:
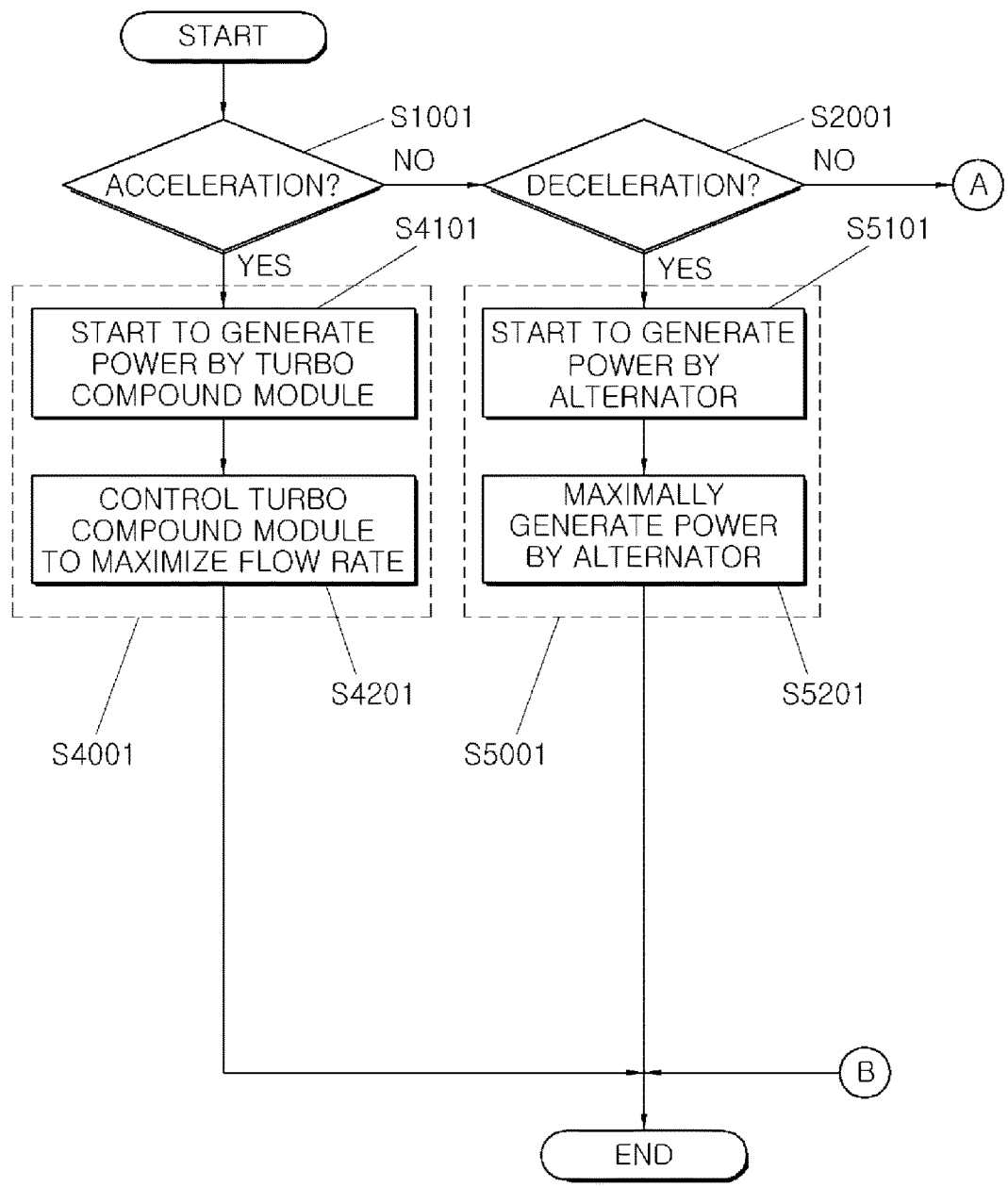
FIGS. 6A and 6B are flow charts illustrating a generation control method for a vehicle according to a second exemplary embodiment of the present invention.
Figure 6B:
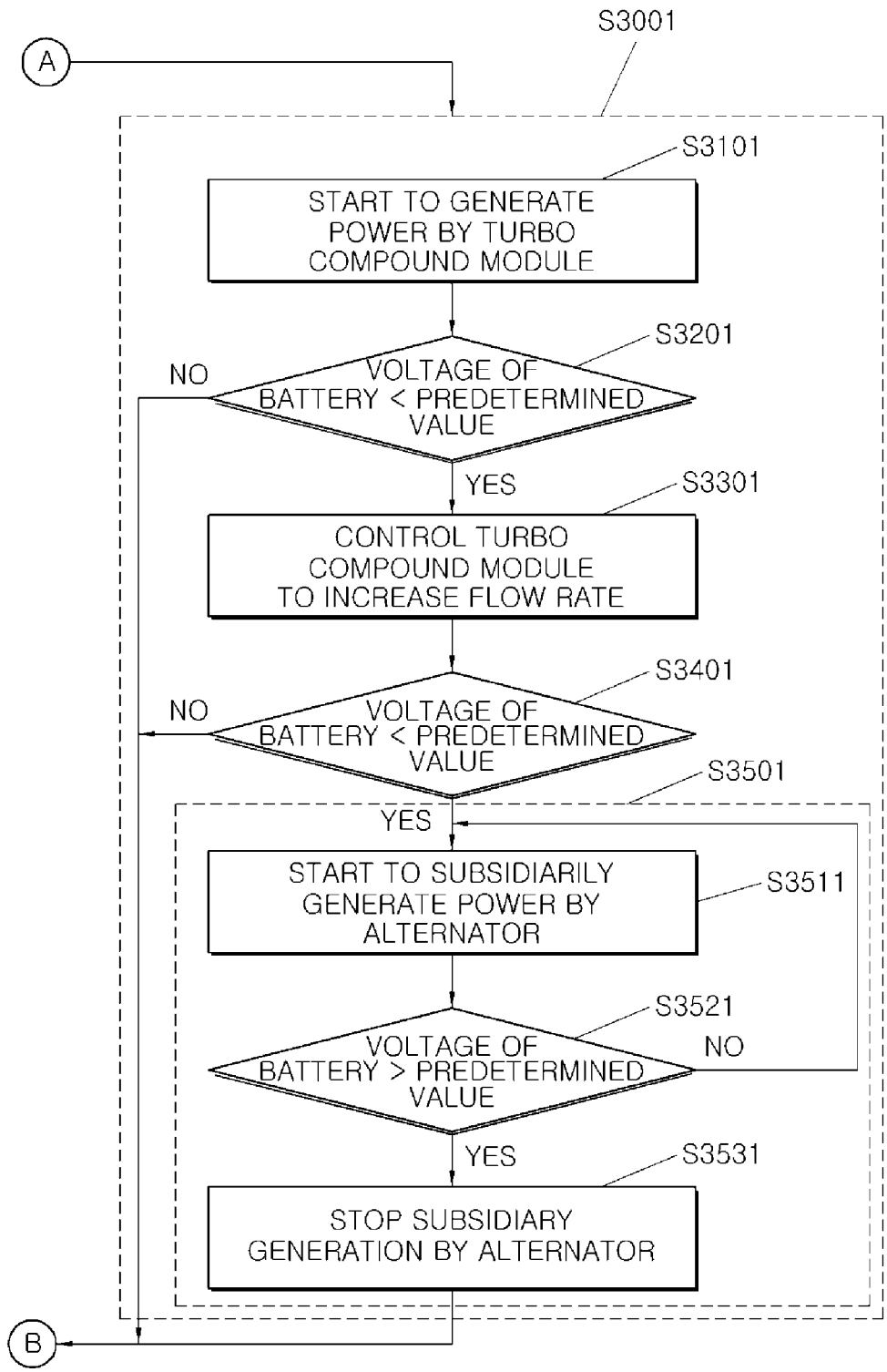

FIGS. 6A and 6B are flow charts illustrating a generation control method for a vehicle according to a second exemplary embodiment of the present invention. The same components and functions as those of the first exemplary embodiment of the present invention among components of exemplary embodiments of the present invention are denoted by reference numerals of FIGS. 5A and 5B, and the detailed description thereof will be omitted.

Referring to FIGS. 6A and 6B, the generation control method for a vehicle according to a second exemplary embodiment of the present invention may include an acceleration driving determination step (S1001), a deceleration driving generation step (S2001), and a constant speed driving generation step (S3001). In more detail, the constant speed driving generation step (S3001) according to the second exemplary embodiment of the present invention is the same as the constant speed driving generation step (S3000) according to the first exemplary embodiment of the present invention as described above but the acceleration driving determination step (S1001) and the deceleration driving determination step (S2001) according to the second exemplary embodiment of the present invention are different from the deceleration driving determination step (S1000) and the acceleration driving determination step (S2000) according to the first exemplary embodiment of the present invention as described above in that the ordering thereof is changed. That is, the second exemplary embodiment of the present invention is different from the first exemplary embodiment of the present invention as described above in that the ordering thereof is changed.

The acceleration driving determination step (S1001), the deceleration driving determination step (S2001), and the constant speed driving generation step (S3001) according to the second exemplary embodiment of the present invention each are substantially the same as the acceleration driving determination step (S2000), the deceleration driving determination step (S1000), and the constant speed driving generation step (S3000) according to the first exemplary embodiment of the present invention as described above and the detailed description thereof will be described. In other words, steps (S4001, S4101, S4201) are the same as the steps (S4000, S4100, S4200) of the FIG. 5A, and steps (S5001, S5101, S5201) are the same as the steps (S500, S5100, S5200) of the FIG. 5A, and steps (S3001, S3101, S3201, S3301, S3401, S3501, S3511, S3521, S3531) are the same the steps (S3000, S3100, S3200, S3300, S3400, S3500, S3510, S3520, S3530) of the FIG. 5B.

According to the generation control method in accordance with the exemplary embodiments of the present invention, it is possible to efficiently charge the battery of the vehicle by charging the battery of the vehicle by checking the driving state of the vehicle even when the vehicle is in the deceleration driving state and the vehicle is in the acceleration driving state or the constant speed driving state.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A generation control method for a vehicle, comprising:
   a deceleration driving determination step of determining, by a controller, whether a driving state of the vehicle is a deceleration driving state;
   an acceleration driving determination step of determining, by the controller, whether the driving state of the vehicle is an acceleration driving state when the driving state of the vehicle is not the deceleration driving state; and
   a constant speed driving generation step of performing, by the controller, constant speed driving generation when the driving state of the vehicle is not the deceleration driving state or the acceleration driving state,
   wherein the constant speed driving generation step includes:
     a turbo generation starting step of allowing a turbo compound module to start generating power to charge a battery;
     a battery voltage determination step of determining whether a voltage of the battery charged by the turbo compound module is less than a predetermined value;
     a flow rate increasing control step of increasing a flow rate of exhaust gas introduced into the turbo compound module when the voltage of the battery is less than the predetermined value;

a battery voltage re-determination step of determining whether the voltage of the battery is less than the predetermined value; and an alternator generation step of allowing an alternator to start generating power until the voltage of the battery exceeds the predetermined value if it is determined in the battery voltage re-determination step that the voltage of the battery is less than the predetermined value so as to charge the battery.

2. The generation control method for a vehicle of claim 1, wherein the deceleration driving determination step includes:

an alternator generation step of allowing an alternator to start generating power to charge a battery when the driving state of the vehicle is the deceleration driving state; and a maximum generation control step of maximally increasing a generation quantity of the alternator.

3. The generation control method for a vehicle of claim 1, wherein the acceleration driving determination step includes:

a turbo compound generation step of allowing a turbo compound module to start generating power to charge a battery when the driving state of the vehicle is the acceleration driving state; and a maximum flow rate control step of maximally increasing a flow rate of exhaust gas introduced into the turbo compound module.

4. The generation control method for a vehicle of claim 1, wherein the constant speed driving generation step is performed when the driving state of the vehicle is a constant driving state or an idle driving state.

5. The generation control method for a vehicle of claim 1, wherein the constant speed driving generation step ends, if it is determined in the battery voltage determination step that the voltage of the battery charged by the turbo compound module is equal to or more than the predetermined value.

6. The generation control method for a vehicle of claim 1, wherein in the flow rate increasing control step, a valve open value of the turbo compound module is controlled to increase the flow rate of exhaust gas introduced into the turbo compound module.

7. The generation control method for a vehicle of claim 1, wherein the constant speed driving generation step ends, if it is determined in the battery voltage re-determination step that the voltage of the battery is equal to or more than the predetermined value.

8. The generation control method for a vehicle of claim 1, wherein the alternator generation step includes:

an alternator generation starting step of allowing the alternator to start generating power when the voltage of the battery is less than the predetermined value to charge the battery;

an alternator charging voltage determination step of determining whether the voltage of the battery charged by the alternator exceeds the predetermined value; and an alternator generation stopping step of stopping the generation of the alternator when the voltage of the battery exceeds the predetermined value.

9. The generation control method for a vehicle of claim 8, wherein the alternator generation starting step is performed again, if it is determined in the alternator charging voltage determination step that the voltage of the battery charged by the alternator is equal to or less than the predetermined value.

10. A generation control method for a vehicle, comprising:

an acceleration driving determination step of determining, by a controller, whether a driving state of the vehicle is an acceleration driving state;

a deceleration driving determination step of determining, by the controller, whether the driving state of the vehicle is a deceleration driving state when the driving state of the vehicle is not the acceleration driving state; and an acceleration driving generation step of performing, by the controller, constant speed driving generation when the driving state of the vehicle is not the deceleration driving state or the acceleration driving state, wherein the constant speed driving generation step includes:

a turbo generation starting step of allowing a turbo compound module to start generating power to charge a battery;

a battery voltage determination step of determining whether a voltage of the battery charged by the turbo compound module is less than a predetermined value;

a flow rate increasing control step of increasing a flow rate of exhaust gas introduced into the turbo compound module when the voltage of the battery is less than the predetermined value;

a battery voltage re-determination step of determining whether the voltage of the battery is less than the predetermined value; and an alternator generation step of allowing an alternator to start generating power until the voltage of the battery exceeds the predetermined value if it is determined in the battery voltage re-determination step that the voltage of the battery is less than the predetermined value so as to charge the battery.

* * * * *